United States Patent [19]

Linder et al.

[11] Patent Number: 5,028,337

[45] Date of Patent: Jul. 2, 1991

[54] COATED MEMBRANES

[75] Inventors: Charles Linder, Rehovot; Mara Nemas, Neve Monoson; Mordechai Perry, Petach Tikva; Reuven Ketraro, Rishon Letzion, all of Israel

[73] Assignee: Aligena AG, Basel, Switzerland

[21] Appl. No.: 507,565

[22] Filed: Apr. 11, 1990

[30] Foreign Application Priority Data

Apr. 14, 1989 [IL] Israel ........................................ 89970

[51] Int. Cl.$^5$ ...................... B01D 61/02; B01D 61/14; B01D 69/00
[52] U.S. Cl. .................................... 210/642; 210/644; 210/654; 210/655; 210/500.27
[58] Field of Search .................. 210/500.38, 634, 642, 210/644–655, 500.27, 500.28–500.43

[56] References Cited

U.S. PATENT DOCUMENTS 4,277,344 7/1981 Cadotte .......................... 210/300.38
4,659,474 4/1987 Perry et al. .

FOREIGN PATENT DOCUMENTS 0111714 6/1984 European Pat. Off. .
0242761 10/1987 European Pat. Off. .

Primary Examiner—Frank Sever
Attorney, Agent, or Firm—Wenderoth, Lind & Ponack

[57] ABSTRACT

Composite membranes are provided comprising an underlying membrane selected from the group consisting of microfiltration, ultrafiltration and reverse osmosis membranes; and a coating thereon comprising at least one member selected from the group consisting of polyaromatic polymers and sulfonated poly(haloalkylenes), which has been subjected to a post-coating crosslinking treatment. These coated membranes are useful for various separation processes, especially in the food industry.

44 Claims, No Drawings

COATED MEMBRANES

FIELD OF THE INVENTION

The present invention relates to coated membranes which find application for separation processes especially in the food industry.

BACKGROUND OF THE INVENTION

There exist at the present time separation problems in food processing, which cannot be adequately solved by using currently available membranes. Many such problems concern the separation of sugars, amino acids and organic acids and bases, from inorganic salts. A further problem concerns the clarification with aggressive solutes, of solutions made from fruit or vegetables; such solutes could damage the membranes in the course of time. Existing membranes have too high rejections of inorganic salts to permit a suitable separation (or if their rejections of inorganic salts is within a desired range, then their rejection of solute which it is desired to concentrate is too low); their application range is limited by their sensitivity to oxidizing agents and solvents; they are not necessarily readily sterilizable by steam or by chemical means; and they require extensive testing before being allowed to come in contact with products intended for human consumption. The present invention provides inter alia membranes which overcome the aforementioned deficiencies of the prior art membranes, and also afford additional advantages. Thus, for example, while many stable food-safe membranes are available with 80+% rejections for molecular weights above 2000, few if any are available which have the desired properties indicated above and at the same time reject molecules of molecular weights below 1500. The present invention provides inter alia membranes in which such molecular weight limits can be advantageously selected as desired.

SUMMARY OF THE INVENTION

It is accordingly a principal object of the present invention to provide membranes useful for effecting separations in the food processing art.

Another object of the invention is to provide such membranes which are oxidation and solvent resistant, may be readily sterilized and may safely be allowed to come in contact with products intended for human consumption.

Still another object of the invention is to provide such membranes in which molecular weight cut-off limits can be advantageously selected.

A further object of the invention is to provide novel membranes and precursors thereof per se, which find application in the food processing art.

Other objects of the invention will appear from the following description.

The present invention accordingly provides in one aspect, a coated membrane, in which the underlying membrane (1) is a microfiltration (MF), ultrafiltration (UF) or Reverse Osmosis (RO) membrane, and in which the coating (2) comprises at least one member selected from polyaromatic polymers and sulfonated poly(haloalkylenes), which has been subjected to a post-coating crosslinking treatment.

DETAILED DESCRIPTION OF THE INVENTION

The underlying membrane (1) may be asymmetric or symmetric, preferably of a thickness within the range of from about 10 microns to about 1 mm., average pore size in the range of from about 10 Å to about 5 microns, and minimum porosity about 10%. Its molecular weight cut-off preferably lies within the range of from about 200 to about 100,000 daltons. It is most preferably of thickness within the range of from about 100 to about 500 microns. The preferred average pore size of the underlying membrane will in general be a function of the particular application, as for example, a pore size lying within the range of from about 20 to about 1000 Å, more preferably from about 20 to about 200 Å, for achievement of optimum rejection of molecules of molecular weight 1000, and flux. Its minimum porosity is most preferably greater than 50%, in order to achieve adequate flux.

The coating (2) may be coated on the external and internal surfaces of the underlying membrane (1); it may also be coated on one external surface with partial penetration into the internal pores. While the invention is not to be limited by any theory, it is believed that the practical effect of the coating is to modify the rejection and flux properties of the underlying membrane.

As an optional feature, the coated membrane of the invention may be supported on a substrate, for added mechanical strength. It is to be understood that the substrate has a relatively open structure, and imparts little or no flux hindrance or rejection influence to the coated membrane.

In order to successfully coat the underlying polymer, the following criteria should be met:

1. The coating should be effected with a solution of polyaromatic crosslinkable polymers, in a solvent which does not dissolve, react with, or unduly swell the membrane, although a small amount of swelling is permissible.

2. The underlying membrane should preferably be comprised of cross-linked polymer, in order to limit its susceptibility to swelling. If the underlying membrane is not comprised of crosslinked polymer, then its physicochemical properties must in any event be such as to limit its susceptibility to swelling.

3. The coating polymer should be a good film former which adheres well to the underlying membrane.

4. The coating should not dissolve or be otherwise readily removable, when the coated membrane is in use.

The following criteria also preferably apply:

5. The polymer of the coating should be modifiable chemically or by heat, so as to render it insoluble in the original coating solvent, and to impart solvent, pH and temperature stability.

6. The underlying membrane should also possess solvent, pH and temperature stability. Moreover, it should be available in a range of molecular weight cut-offs (prior to coating), for optimum selection to solve a given application problem.

The polyaromatic coating polymer may be selected from the following, which may be halomethylated, quaternized and/or sulfonated, as desirable or necessary, prior to the coating step, e.g., aromatic oxide polymers such as 2,6-dimethyl polyphenyleneoxides; aromatic polysulfones; aromatic polyether sulfones; aromatic polyether ketones; linear polyaromatic epoxides; and aryl polymers such as polystyrene and poly(vinyltoluene) polymers. The sulfonated poly(haloalkylene) coating polymer may be, e.g. sulfonated polyvinyl chloride, polyvinyl fluoride, polyvinylidene fluoride or polyvinylidene fluoride/hexafluoropropylene.

While from one point of view, ceramic and carbon-like underlying membranes would be suitable because of their solvent, temperature and pH stability, nevertheless, they are not available in a broad range of pore sizes; moreover, they are difficult to manufacture and therefore expensive.

A category of polymers of which the underlying membranes may be comprised, and which may be successfully coated by carefully choosing the coating solvent and coating polymers, are aromatic polysulfones; polyphenylenesulfones; aromatic polyether sulfones from bisphenol A and dichlorodiphenoxysulfone; aromatic polyether ketones; sulfonated polyether ketones; and phenoxides made from epichlorohydrin and bisphenol A.

However, in a particular embodiment of the invention, the underlying membrane preferably comprises polyvinylidene fluoride or sulfonated polyvinylidene fluoride. Membranes made from these materials have superior insensitivity to solvents from which the membrane is coated by coating polymer, and moreover can be made in a wide range of pore sizes. They may also be crosslinked by heat and/or amines(primary, secondary and tertiary) and/or tetraalkylguanidines and/or alkali metal alkoxides or amides, to improve still further their stability to solvents. It has been found that better crosslinked systems generally are obtained when using polynucleophile substituted reagents than when using mononucleophiles; such polysubstituted reagents, as for example di-nucleophile substituted reagents such as bis-primary amines, bis-thiols and bis-phenols, are accordingly preferred. Particularly preferred groups of such reagents are polyfunctional amines and polyfunctional thiols. The use of crosslinked sulfonated polyvinylidene fluoride constitutes a presently preferred mode of operating the invention, since the base membrane, which may be cast to form UF and RO membranes over a range of pore sizes, is readily crosslinkable by the methods described.

In a further embodiment of the invention, polyacrylonitrile, insolubilized and crosslinked as will be described infra, may be used as the polymer of which the underlying membrane is comprised. Such membranes based on polyacrylonitrile afford stability to solvents, pH and temperature, over a wide range of pore sizes. They tend to be more stable to a wider variety of solvents than polyvinylidene fluoride polymers. The polyacrylonitrile membranes may be subjected to the steps of immersion in, or exposure to, reagents, and/or heating; as e.g., treatment with base (organic or inorganic) and heating. The conditions for treatment must be chosen so as not to destroy the structure. Tightening of the membrane may occur, but this would allow improvement in cut-offs. If excessive tightening does occur, then one may choose a more open membrane, initially.

Casting of the underlying membrane, comprised of polysulfones, polyether sulfones, polyether ketones, or polyvinylidene fluoride or sulfonated polyvinylidene fluoride, or of polyacrylonitrile, may be performed by any number of casting procedures cited in the literature, for example U.S. Pat. Nos. 3,556,305, 3,567,810, 3,615,024, 4,029,582 and 4,188,354; GB 2,000,720; Office of Saline Water R & D Progress Report No. 357, October 1967; Reverse Osmosis and Synthetic Membranes, Ed. Sourirajan; Murari et al, J. Membr. Sci. 16: 121–135 and 181–193 (1983). Thus, the polymer or its derivatives may be dissolved in a suitable solvent or solvent mixture (e.g. NMP, DMF, DMSO, hexamethylphosphoramide, N,N-dimethylacetamide, dioxane), which may or may not contain cosolvents, partial solvents, nonsolvents, salts, surfactants or electrolytes, for altering or modifying the membrane morphology and its flux and rejection properties (e.g. acetone, ethanol, methanol, formamide, water, methyl ethyl ketone, triethyl phosphate, sulfuric acid, HCl, partial esters of fatty acids and sugar alcohols, or their ethylene oxide adducts, sodium dodecyl sulfate, sodium dodecylbenzene sulfonate, NaOH, KCl, zinc chloride, calcium chloride, lithium nitrate, LiCl, magnesium perchlorate, etc.).

The casting solution may be filtered by any of the known processes (e.g. pressure filtration through microporous filters, or by centrifugation), and cast on a support such as glass, metal, paper, plastic, etc., from which it may then be removed. It is preferred, however, to cast onto a porous substrate from which the membrane is not removed. Such porous substrates may be non-woven, or woven, including cellulosics, polyethylene, polypropylene, nylon, vinyl chloride homo- and co-polymers, polystyrene, polyesters such as polyethylene terephthalate, polyvinylidene fluoride, polytetrafluorethylene, glass fibers, porous carbon, graphite, inorganic membranes based on alumina and/or silica (possibly coated with zirconium oxides). The membrane may alternatively be formed as a hollow fiber or tubelet, not requiring a support for practical use; or the support may be of such shape, and the membrane is cast internally thereon.

The concentration of polymer in the casting solution may vary as a function of its MW and additives, and may be for example, within the range of about 5–80%, preferably about 10–50%, most preferably about 15–30%. The casting temperature may vary from about $-20°$ to about $100°$ C., preferably about $0°$ to $60°$ C., depending on the particular polymer, its molecular weight and the cosolvents and additives in the casting solution.

The casting solution may be applied to the above-mentioned supports or porous substrates by any of the well-known techniques which are familiar to those skilled in the art. The wet film thickness may lie within the range of about 15 microns to about 5 mm., preferably about 50 to about 800 microns, most preferably about 100 to about 500 microns for flat membranes; tubelets may of course have thicker walls. The wet supported film may be immersed immediately, or after a partial drying step (of from about 5 secs. to about 48 hours, under ambient conditions or elevated temperature and/or under vacuum), in a gelling bath of a nonsolvent. Such baths generally comprise water, to which there may optionally be added a small percentage of a solvent (e.g. DMF or NMP) and/or surfactant (e.g. sodium dodecyl sulfate), at a temperature within the range of about $0°$ to about $70°$ C.. An example of a widely used gelling bath is water with 0.5% sodium dodecyl sulfate at $4°$ C.. In another mode of forming membranes, a polymer solution containing a component which may be leached out in water or other solvent, is cast and dried prior to immersion; the subsequent immersion step removes leachable material, resulting in a porous membrane. In a third variation, a polymer solution without any leachable materials is cast and taken to dryness, resulting in a porous membrane by virtue of the physicochemical properties of the particular polymer and solvent and/or other ingredients present in the casting solution, whereby pores are created. The foregoing cast membranes may then be coated, and optionally otherwise modified, as described elsewhere herein.

Other processes for making UF and MF are extrusion and controlled thermostretching and cooling cycles, in order to make, e.g., microporous polytetrafluoroethylene (PTFE), polypropylene and polyethylene; other processes such as pyrolysis of thermoset polymers to make carbon or graphite membranes, or sintering to make ceramic, carbon and graphite membranes for RO, UF and MF, may alternatively be used. The graphite, carbon and ceramic membranes are especially useful if a heat treatment above about 150° and up to about 1000° C. are needed, but some engineering plastics may also be heated for short periods of time up to about 300° C., with little or no detriment.

As mentioned above, the solvent-and pH-resistant membranes which are to be coated, comprise in one preferred case, cross-linked acrylonitrile homo-and co-polymers in the RO, UF and MF ranges, and include asymmetric and symmetric membranes. Such membranes which comprise acrylonitrile-derived polymers, form part of the present invention, per se. These polymers may be formed into membranes of about 10 microns to 1 mm. thickness, by casting alone or on a support, in any of the configurations as has already been described. Such polymeric membranes are subsequently subjected to crosslinking by a combination of chemical reactions and heating. In acrylonitrile copolymers, the proportion of acrylonitrile is preferably at least about 20%, and most preferably at least about 50% by weight, of the total monomers. In place of acrylonitrile itself in these membraneforming homo-and co-polymers, there may alternatively be used substituted acrylonitriles, e.g. $C_{1-6}$-alkylacrylonitriles such as methacrylonitrile and hexylacrylonitrile, arylacrylonitriles such as phenylacrylonitrile, haloacrylonitriles (in which halo signifies fluoro, chloro or bromo) such as fluoroacrylonitrile and chloroacrylonitrile, and thioacrylonitrile. Suitable comonomers which can be copolymerized with acrylonitriles and substituted acrylonitriles include monomers which may contain hydrophobic, hydrophilic, polar or ionic groups, especially, e.g., vinyl esters having 2 to 18 carbon atoms in the acid moiety, such as vinyl acetate; vinyl ethers having 3 to 12 carbon atoms; vinylpyridine; vinyl chloride; styrene; and acrylic and methacrylic acids and esters thereof having e.g. 1 to 4 carbon atoms in the ester moiety. Further suitable comonomers are maleic anhydride; 2-aminoethyl methacrylate; allyl compounds such as allyl alcohol, allyl-and methallylsulfonic acids and their salts (e.g. alkali metal salts), allyl and methallyl halides, allylamines and allyl p-toluenesulfonate. The term "acrylonitrile (or substituted acrylonitrile) copolymers" is intended to include such copolymers comprising more than 2 monomers, e.g. terpolymers such as acrylonitrile/styrene/butadiene ("ABS polymers"), acrylonitrile/methyl methacrylate/vinyl acetate and acrylonitrile/methyl methacrylate/sodium allylsulfonate, and quadripolymers. The underlying membrane may also be made from mixtures of acrylonitrile (or substituted acrylonitrile) homopolymers and/or copolymers.

The membrane derived from acrylonitrile (or substituted acrylonitrile)-derived polymers, once formed, is insolubilized by crosslinking, which may be effected with organic or inorganic bases, acids or free-radical initiators, followed by heating if necessary. Organic bases are preferably used for this purpose.

The term "organic bases" in this context includes amines, and in particular metal $C_{1-10}$ straight or branched chain alkoxides such as sodium or potassium methoxide, ethoxide, propoxide, isopropoxide, butoxide or tert.-butoxide. Also preferred are inorganic bases e.g. alkali metal hydroxides such as sodium or potassium hydroxide. In general, the metal alkoxides are utilized in alcoholic medium, while the alkali metal hydroxides are utilized in aqueous medium. In either case, the concentrations of the bases may vary in the range of from about 0.01 to about 50%, preferably from about 0.05 to about 20%, most preferably from about 0.1 to about 1% wt./vol. Other utilizable inorganic bases are hydroxylamine, ammonia and alkali metal amides.

Thus, for example, the membrane may be immersed in a solution of a base such as sodium or potassium alkoxide, or NaOH or KOH, at a concentration of between about 0.05 and about 1.0% wt./vol. in methanol or ethanol, for the alkoxide bases, and between about 1 and about 20% wt./vol. for the hydroxide bases inwater, for a time which lies between about 5 minutes and about 8 hours, preferably at a minimum temperature of about 15° C., most preferably at least about 30° C., and up to about the reflux temperature of the particular solvent used.

A person skilled in the art may readily determine the times required for treating the membrane with bases in order that the product will not swell to an undesirable extent when immersed in solvents such as dimethyl formamide (DMF) or 1-methylpyrrolidin-2-one (NMP); it is preferred that such swelling is no more than about 50%, more preferably no more than about 15%, and especially no more than about 5%. Following the treatment just described, the membrane is drained and heated at an elevated temperature, e.g. by placing in an oven at a temperature which is gradually raised from about 10° C. above room temperature to (say) about 110° to about 130° C. The purpose of effecting at least some crosslinking prior to heating above the glass transition point of the membrane is to prevent plastic flow and closing of the membrane pore structure. While some closure may be tolerated and in fact be desirable, in order to improve rejection, this should not lower water flux below economically acceptable levels for the given application. The flux level is best controlled by crosslinking as much as possible before the step of heating at an elevated temperature, as described above.

After heating to (say) about 110° to about 130° C., the membrane may be further insolubilized or crosslinked by heating (e.g. in air) in the region of about 250° C. for a time period of several minutes up to several hours, but this must be done carefully to prevent compaction. If desired, the membrane may be carbonized by heating in a non-reactive environment to say, about 600° to 1000° C.; for this purpose, it is preferred that the membrane is in the form of hollow fibers or is a planar membrane, and is supported by porous ceramic, carbon or metal tubelets, or plates. Preferably, the crosslinking step may be carried out on a copolymer of polyacrylonitrile with acrylic acid or itaconic acid, which are known to accelerate the crosslinking reaction.

Crosslinking the (optionally substituted) acrylonitrile-derived polymer of the membrane may alternatively be effected by use of organic or inorganic acids (including Lewis acids) such as hydrogen halides (e.g. HBr), p-toluenesulfonic acid, stannic chloride, aluminum halides (e.g. the trichloride, tribromide and triiodide) and zinc chloride.

Methods for crosslinking polyvinylidene fluoride, sulfonated polyvinylidene fluoride and other fluoropolymers are known, see e.g. U.S. Pat. Nos. 3,516,791 and 3,840,646, as well as Fluoropolymers, L. A. Wall, ed., High Polymers, Vol. XXV, Interscience 1972. We have found that one preferred method is to immerse the fluoropolymer in question in solutions of metal alkoxides or polyfunctional amines such as diaminoethane, diaminopropane or diaminobutane. The amines may be used in a wide concentration range e.g. within the range of 1 to 90% in the reaction solutions; in general terms the alkoxides may be used in nonaqueous solutions in a concentration which lies within the range of 0.05 to 50%, preferably within the range of from 1 to 2%. The amino compounds which are soluble in water are preferably used in this solvent.

In accordance with an embodiment of the invention, an additional component which will effect crosslinking of the coating after it has dried, or after it has dried and has been heated, may be used. This additional component may be e.g. a Lewis acid such as $SnCl_4$.

The coating step in accordance with an embodiment of the invention may be carried out, for example, by immersing the underlying membrane in a solution of the coating polymer in a suitable solvent. This solution may contain the coating polymer in a concentration which lies in the range of (e.g.) about 0.01 to about 10.0%, preferably about 0.1 to 2.0% wt./vol. The solvent should not dissolve or excessively swell the underlying membrane, which is being coated. Note that crosslinked and/or carbonized polyacrylonitrile membranes are insensitive to most solvents such as aliphatic and aromatic alcohols, dimethylformamide (DMF), dimethylacetamide N-methylpyrrolidone (NMP), dimethylsulfoxide (DMSO), halohydrocarbons (e.g. methylene chloride, chloroform, ethylenedichloride, fluorinated hydrocarbons marketed as Freons), ethers—both linear and cyclic (such as diethyl ether and tetrahydrofuran (THF)), and aromatic hydrocarbons such as benzene and toluene, and combinations thereof.

Membranes formed from crosslinked polyvinylidene fluoride and sulfonated polyvinylidene fluoride are not as solvent resistant as those formed from (optionally substituted) acrylonitrile-derived polymers, but may be coated using any of the above-mentioned solvents, although in the case of solvents which cause swelling such as DMF, NMP and DMSO, immersion times should be limited to five minutes or less. It has been found that the halomethylated coating polymers can be dissolved in DMF, NMP, DMSO, THF, toluene and haloalkanes such as methylene chloride. The crosslinked (optionally substituted) acrylonitrile-derived polymers can be coated using all of these solvents, without undue consideration as to the time of immersion in the coating solution, while in the case of coating polyvinylidene fluoride and sulfonated polyvinylidene fluoride, the time of immersion is an important consideration if undue swelling is to be prevented, owing to the partial solubility of these fluorinated polymers.

Partially quaternized halomethyl coating polymers have a higher solubility than the non-quaternized analogues in alcohols such as ethanol. For example, halomethylated polyphenyleneoxide containing more than 1.8 meq. quaternary groups dissolves in ethanol. Using such quaternized coating polymers, it is possible to successfully coat polysulfone and polyether/sulfone membranes which are sensitive to most of the above solvents, when solvents selected from aliphatic hydrocarbons, aliphatic halohydrocarbons (including Freons), alcohols or water, are utilized; such membranes are well-known in the art in the UF, UF/RO and MF ranges.

In accordance with an embodiment of the invention, the coated membranes are dried at room temperature, or heated at up to about 110° to about 130° C., for a time which lies within the range generally of about 1 minute to about 24 hours. Subsequently, the coating is crosslinked; it may also be subjected to reactions which introduce additional groups such as amines, hydroxyl and/or quaternary ammonium and/or carboxylic or sulfonic groups, in order to increase the passage of water and salts.

In order to crosslink the coating supported on the membrane, it may be, for example, immersed in a solution containing a polyfunctional amine. Exemplary amines are ammonia, primary aliphatic amines containing 1 to 8 carbon atoms, aromatic primary amines (containing e.g. phenyl or naphthyl which may be substituted by other functional groups such as nitro, carboxylic, sulfonic and hydroxyl), as well as diamines (e.g. diaminoethane, diaminopropane and diaminobutane), triamines and other polyamino compounds in which the amino groups are attached to aliphatic or aromatic groups analogous to those just described. Crosslinking with di-, tri- or poly- secondary or tertiary amines is also possible. The preferred solvent for the treatment with polyfunctional amine is water, because of its low cost, its ease of handling, and the fact that in many cases it does not remove the coating, or cause it to swell. Reactants such as diaminoethane, diaminopropane and diaminobutane, in particular, were found to efficiently crosslink the (optionally partially quaternized) halomethylated coating, using an aqueous medium; the concentration of diamine in water may lie within the range of from about 0.1 to about 50%, preferably about 1.0 to about 10.0% wt./vol., and the preferred temperature lies within the range of about 0° to about 95° C., more preferably about 15° to about 40° C. Other solvents and polyfunctional amines may of course be used, provided that they do not dissolve the coating or swell the underlying membrane.

Crosslinking of the coating(s) may also be effected, alternatively or additionally, by adding coating solution containing polymers including halomethyl groups.

As already stated, an additional component which will effect crosslinking of the coating after it has dried, or after it has dried and has been heated, may be used; this additional component may be e.g. a Lewis acid such as $SnCl_4$. Alternatively, crosslinking may be effected by exposing the coated membranes to the action of chlorosulfonic acid followed by heating.

According to a particular embodiment of the invention, there may be used as the coating polymer sulfonated polyaromatic polymers such as aromatic oxide polymers [e.g. sulfonated poly(2,6,-dimethylphenylene oxide)], aromatic polysulfones, aromatic polyethersulfones, aromatic polyether ketones, linear aromatic epoxides and aryl polymers such as polystyrene and poly (vinyltoluene), or sulfonated poly(haloalkylenes) [e.g. sulfonated polyvinyl chloride, polyvinyl fluoride, polyvinylidene fluoride or polyvinylidene fluoride/hexafluoropropylene]. These sulfonated polymers may be prepared by any of the well-known method, such as chlorosulfonation with chlorosulfonic acid or sulfuric acid/sulfur trioxide or sulfur trioxide complexes (e.g. with DMF or pyridine). Sulfonation methods are described in, e.g., EP 0142973A2, EP 0202849 and J. Chem. Eng. of Japan, 16:1405 (1983). The degree of sulfonation may vary from 0.1 to 3.0, the preferred range being from 0.8 to 2.2 meq./g. Depending on e.g., the degree of sulfonation, the nature of the sulfonated aromatic polymer and of the support upon which the coating is effected, coating solvents may be, by way of example, alcohols (such as methanol, ethanol, propanol and butanol), acetone, halohydrocarbons, tetrahydrofurans, water, aromatics, NMP, DMF, DMSO, sulfolane, DMAC and sulfuric acid. One preferred coating system is sulfonated polysulfone containing 1.5 meq./g. sulfonic groups, coated from ethanol onto a polysulfone, polyacrylonitrile or polyvinylidene fluoride support, the material of the support being either crosslinked or not, as explained elsewhere herein.

Once coated upon the support, the sulfonated polyaromatic polymer coating is crosslinked by (a) heat, (b) immersion in a non-dissolving solution of a Lewis acid (e.g. stannic chloride in a fluorinated hydrocarbon), followed by draining and heating, (c) partial chlorosulfonation by immersion in thionyl chloride, in a solvent which does not dissolve the coating, such as fluorinated hydrocarbons, followed by draining, immersion in a diamine (such as ethylenediamine, propylenediamine or butylenediamine, which may be used undiluted or e.g. in aqueous solution) or a polyamine, and optionally heating, (d) procedure "c" but after including a Lewis acid such as stannic chloride, with the thionyl chloride, or immersion in a post stannic chloride bath followed by heating, or (e) additional chlorosulfonation with chlorosulfonic acid in a fluorocarbon.

In method (c), immersion in the diamine or polyamine is preferably effected with such a concentration of diamine or polymaine that up to 20% of the sulfonic groups are crosslinked in the form of sulfonamide bonds and the remainder are present as sulfonic acid groups. Is is also preferred that the diamine or polyamine be used in aqueous solution.

It is presently preferred that the sulfonated poly(haloalkylenes) are crosslinked according to method (c), with especially preferred conditions being according to the preceding paragraph. These polymers may be alternatively crosslinked (e.g.) by immersion in the alkoxide solutions mentioned previously.

After crosslinking the membrane-supported coating as described generally herein, it may be further reacted. Quaternary ammonium groups may be introduced if not already present, by immersion of the membrane into aqueous solutions of tertiary amines, or solutions thereof in other solvents which will not dissolve or excessively swell the coated membranes. Water is the preferred solvent, the preferred concentration of tertiary amine lying within the range of from about 0.1 to about 50.0% wt./vol., desirably at a pH lying within the range of from about 4 to about 12, most preferably from about 6 to about 10. Additional quaternization may be necessary if the coating polymer is insufficiently quaternized prior to coating, to increase water flux.

Sulfonic groups may be introduced into the supported polymeric coating (which has been crosslinked, but prior to any quaternization) by immersing the coated membrane in a solution of chlorosulfonic acid in aliphatic hydrocarbons such as hexane, or in fluorinated hydrocarbons (e.g. Freons such as trichlorotrifluororethane). These solvents are generally applicable when the underlying membrane is formed from (optionally substituted) acrylonitrile-derived polymers, polyvinylidene fluoride or sulfonated polyvinylidene fluoride, but for polyether sulfone or polysulfone derived membranes, only aliphatic solvents such as hexane or Freons may be used, because haloaromatic solvents will either dissolve or cause excessive swelling of the membranes. Sulfonation may alternatively be effected by use of sulfuric acid or sulfur trioxide complexes (e.g. with DMF or pyridine), or by use of sulfur trioxide gas. Sulfonation methods are described in e.g. EP 0142973 A2, EP 0202849 and J. Chem. Eng. of Japan, 16:1405 (1983).

The total thickness of the coating (prior to crosslinking) on the membrane lies within the range of from about 10 to about 10,000 nm and the thickness of the semipermeable crosslinked thin film lies within the range of from about 1 to about 15000 nm.

The membranes according to the invention are useful for separating organic compounds of relatively low molecular weight from inorganic salts in aqueous solutions. The method for separating such compounds from these salts in aqueous solutions also forms part of the present invention. This method may be effected by disposing such solutions on one side of the coated membrane according to the invention, and filtering the solutions through the membrane, while applying a hydraulic pressure greater than the osmotic pressure against such solutions in contact with the coated membrane.

The molecular weight range of the organic compounds to be separated by the coated membranes may be less than about 10,000, i.e. the membrane in such a case will have a cutoff level of about 10,000. The uncoated support membranes may have cutoffs ranging from 5 microns down to 1 nanometer. These uncoated but crosslinked membranes of polyacrylonitrile or sulfonated polyvinylidene fluoride may be used for the above separations if the original membranes are in the proper cutoff range; they may also be used for ultrafiltration or microfiltration if their cutoffs are above 10,000 MW. These membranes are characterized by their solvent insensitivity.

The inorganic salts present in the solutions which are subjected to treatment at the coated membrane (i.e. reverse osmosis) are generally alkali metal salts such as alkali metal halides or sulfates, e.g. sodium chloride and sodium sulfate.

The coated membranes of the invention are highly suitable for the separation processes of the type described, and especially ultra attraction reverse osmosis processes. They can be prepared and used as flat or tubular membranes in appropriate separation devices, such as modules. They have superior rejection to organic compounds of low molecular weight, good flux properties, superior flexibility and high overall stabilities, such as resistance to compaction, and to chemical and biological degradation, and solvents. Because of this solvent resistance, the crosslinked polyacrylonitrile membranes and the crosslinked polyvinylidene fluoride and sulfonated polyvinylidene fluoride may be used for filtering organic solvents from soluble matter and particles.

The separation effect (the rejection) of the coated membranes of the invention can be measured as follows. A circular membrane with a surface area of 13 cm.$^2$, resting on a sintered stainless steel disc is placed in a cylindrical cell made of stainless steel. 150 ml. of the solution to be tested, which contains the substance to be tested in a concentration C1 (g./g. solution), are introduced onto the test membrane, and subjected to a pressure of 40 bars using nitrogen. The solution is stirred mechanically. The liquid which collects on the outlet side of the membrane is examined in order to determine its content, i.e. the concentration C2 of the substance under test. 3×5 ml. samples were tested. In general, the amount which flows through the membrane and the composition of the three initial samples are constant. The % rejection can be calculated from the values obtained, using the equation: $R = 100(C1 - C2)/C1$. The amount of the material which passes through the membrane per surface area unit and time unit (called the "flux") is expressed as follows: $\Gamma = V \cdot S^{-1} \cdot t^{-1}$, where $V$ = volume, $S$ = membrane surface area and $t$ = time. As an approximation, $\Gamma$ may be expressed as $m^3/m^2 \cdot d$, i.e. the number of cubic meters per square meter of membrane surface area per day, or as $l/m^2 \cdot h$, i.e. liters per square meter of membrane surface area per hour.

In addition to the measurements on flat coated membranes, measurements on tubular coated membranes 60 cm. in length, and having an outer diameter of 1.4 cm., are also carried out. For this purpose, these tubular membranes are placed in a perforated tube made of stainless steel. The whole is placed in a tube made of polycarbonate. The outflow from the membrane is between this outer polycarbonate tube and the steel tube. A stream of solution is added in turbulent or laminar flow, under pressure. The flow is kept constant at 10-15 l. per minute. The rejection (R) and the flux ($\Gamma$) are calculated in the same way as for the flat membranes.

The composite, i.e. the coated membranes of the invention, as well as the underlying (crosslinked) membranes may also be utilized in a process for separating insoluble particles, colloidal particles and solute molecules from an organic solvent, which comprises contacting a solvent containing such components with these membranes under a superatmospheric pressure greater than the osmotic pressure. Preferred organic solvents are alcohols, ethers, dimethylformamide, N-methylpyrrolidone and dimethyl sulfoxide.

The underlying (crosslinked) membranes may be further utilized in a process for separating by retention at such membranes of high molecular weight insoluble particles, colloidal particles and soluble polymers from aqueous media, while permitting the passage therethrough of any dissolved salts and organic compounds having a molecular weight less than 5000. The process is effected under a superatmospheric pressure greater than the osmotic pressure. The aqueous media may for example be juices and other extracts of fruit and vegetable origin.

The preparation of exemplary starting materials will now be described.

PREPARATION A

Bromination of poly(2,6-dimethyl)phenylene oxide

To a solution of 1 g. poly(2,6-dimethyl)phenylene oxide in 20 ml. CCl$_4$ were added measured amounts of N-bromosuccinimide (NBS) (see Table I, below), and 0.05 g. benzoyl peroxide. The reaction mixture was refluxed for 4 hours, cooled and filtered to remove succinimide. The polymer is precipitated from the filtrate by pouring into methanol, separated by filtration and vacuum-dried at 60° C.

PREPARATION B

Quaternization of bromomethylated poly(2,6-dimethyl)phenylene oxide

To a solution of 0.5 g. of the product of Preparation A dissolved in 50 ml. methylene dichloride was added 5 ml. absolute ethanol and 5 ml. triethylamine, and the reaction mixture was refluxed overnight. The solvents were evaporated and the residual quaternized polymeric product was dried under vacuum at 60° C. The amount of quaternized groups in the polymer was evaluated by titration with perchloric acid in acetic acid, in presence of mercuric acetate, and using methyl violet in acetic acid as indicator. The results are summarized in Table I.

TABLE I

| Run No. | Amount of NBS (mg.) (Preparation A) | mmol./g. quaternary groups determined as $N(C_2H_5)_3$ (Preparation B) |
|---|---|---|
| 1 | 200 | 0.643 |
| 2 | 400 | 1.61 |
| 3 | 500 | 1.73 |
| 4 | 600 | 1.98 |
| 5 | 800 | 2.7 |
| 6 | 1000 | 3.6 |

Note: quaternized polymers 2-6 dissolve in ethanol.

PREPARATION C

Chloromethylation of a polysulfone

The starting polymer (Union Carbide P-1700) is formed by condensation of bisphenol-A and bis-(4-chlorophenyl)sulfone, see formula (I), above. It has rigidity, toughness and good creep resistance character. The mechanical and electrical properties show little change over a wide temperature range, namely from $-100°$ C. to 150° C. The glass transition temperature is 190° C. It is amorphous, soluble in aromatic chlorinated hydrocarbons, esters and ketones; aliphatic hydrocarbons have no effect. Moreover, it is highly resistant to most aqueous reagents, including acids, alkalis and detergents.

To a solution of 5 g. polyether-sulfone (a Union Carbide product, P-1700 and see formula (I) above) in 200 ml. methylene chloride, 10 ml. chloromethyl ether and 0.5 ml. stannic chloride were added. The solution was refluxed for 2 hours, and its initial pinkish color changed to yellow-green. The clear solution was poured into approximately 500 ml. methanol and the precipitated chloromethylated polymer was filtered off, and washed with methanol. Further purification was effected by reprecipitating the product from aqueous dimethylformamide. For analysis, the chloromethyl group in the product was reacted with aniline to give an anilinium salt, which was titrated in situ with sodium methoxide to the yellow-blue end point of Thymol Blue. In the example just given, titration leads to a result of 2.64 mmol./g. Cl in the polymer. Kinetic studies of the chloromethylation reaction by the inventor have shown that the amount of substitution varies with time and can be controlled.

Chloromethylation may alternatively be effected using formaldehyde/HCl, or halomethyl/alkyl ethers.

PREPARATION D

Quaternization of chloromethylated polyethersulfone

To a solution of 5 g. of the product of Preparation C dissolved in 100 ml. methylene dichloride, there was added about 20 ml. ethanol and 15 ml. triethylamine, and the mixture was refluxed for 2 hours. After cooling, the mixture was poured into 200 ml. methanol, and the precipitate was filtered off, washed with methanol and dried. For analysis, 0.1–0.15 g. product was dissolved in 20 ml. chloroform (AR) and 4 ml. glacial acetic acid was added. To this solution, mercuric acetate was added, and the mixture was shaken. Titration was done with perchloric acid in acetic acid (0.1M).

The invention will now be illustrated by the following non-limitative Examples.

EXAMPLE 1

A 1% solution of the product of Preparation B, which contained 2.3 meq. quaternary groups/g. polymer, in 95% ethanol was prepared. A tubular microporous membrane, 1.23 cm. in diameter, on a polyester nonwoven support, was bob cast from a 5% wt./vol. solution of ICI polyether-sulfone ("PES 5001") in NMP. The membrane, which had an 85% rejection to 0.1% dextran 70K, 0% to sodium chloride and a water flux of 2000 l./m$^2$/day, was placed in the above ethanol solution for 5 minutes, drained for 15 minutes, and placed in an oven at 60° C. for 30 minutes. It was then immersed in a 5% wt./vol. diaminoethane solution for 30 minutes, removed, drained and then heated for 24 hours at 90° C. The resultant crosslinked coated membrane had 75% rejection to sucrose, with an initial flux of 1440 l./m$^2$ day at 25 atm. pressure, while the uncoated membranes had rejections of 20%. The salt rejections were less than 20%.

EXAMPLE 2

The membrane was prepared as in Example 1, and checked against 1% aqueosu raffinose. The rejection was 85% with initial flux about 2000 l./m$^2$ day at 25 atm. pressure. The membrane was stable for at least 1000 hours (at which time the % rejection was little changed) and the salt passage was less than 30%. The rejection to Congo Red was 95%.

EXAMPLE 3

A flat sheet membrane was prepared from Union Carbide polysulfone 3500, 15% solution in DMF, and cast 0.2 mm. on Tyvek R nonwoven polyolefin, precipitated in water, washed for 2 hours, immersed in a solution of quaternized polymer from Preparation B, and crosslinked as in Example 1. The performance of the crosslinked coated membrane was similar to Example 1.

EXAMPLE 4

A flat sheet membrane was prepared from Union Carbide polysulfone 3500, 15% solution in DMF, and cast 0.2 mm. on Tyvek R nonwoven polyolefin, precipitated in water, and washed for 2 hours. Polysulfone (Union Carbide 3500) was chloromethylated with chlorodimethyl ether as described in Preparation C. The product, which contained 2.0 meq. Cl/g. polymer, was quaternized as described in Preparation D, except that the reaction mixture was refluxed overnight. The quaternized product was dissolved in ethanol, coated onto the membrane and crosslinked as in Example 1. The resulting crosslinked coated membrane had rejections of 65 and 82% to 1% solutions of sucrose and raffinose, respectively, with salt reject of less than 20% at 28 atmospheres pressure, in flat cells. The rejection to Congo Red was 98%.

EXAMPLE 5

Polyacrylonitrile (98% homopolymer: DuPont A), MW (number average) 50,000, was dissolved in DMF and bob cast onto a tube of nonwoven polyester (1.27 cm. diameter) and gelled in icewater. After washing overnight, the membrane had a 65% rejection to polyethylene glycol of 60K MW, and 5% rejection to sucrose. The polyacrylonitrile membrane was crosslinked by immersion for 5 minutes in 1% wt./vol. sodium ethoxide, drained and then heated to 115° C. for 30 minutes. The original membrane was off-white or beige, but after this treatment, the membrane was dark brown, and it was no longer soluble or swellable in DMF, NMP or DMSO. While the original membrane had less than 18% rejection to raffinose, the crosslinked membrane had a rejection of 45% to raffinose and a 94% rejection to dextran 70K. The crosslinked membrane clarified a cloudy solution of orange peel extract with a flux of 650 l./m$^2$ day; the crosslinking made the membrane insensitive to terpenes in this fruit extract which usually have deleterious effects on non-crosslinked membranes. The crosslinked membrane was subsequently coated and crosslinked with the quaternized polymer obtained in Preparation B, and then had a rejection to raffinose above 60%, with sodium chloride passage of less than 20%; its rejection to Congo Red was above 90%.

EXAMPLE 6A

An underlying membrane was made of polyacrylonitrile as described in Example 5, and coated and crosslinked as in Example 4. The resultant crosslinked coated membrane had a rejection of 82% to raffinose, with a flux of 1200 l./m2/day, and sodium chloride rejection of 18%.

EXAMPLE 6B

Example 6A was repeated except that the polyacrylonitrile support was crosslinked by placing the membrane in 10% aqueous NaOH solution for 15 minutes at 20 C., rinsing and heating to 110 C. for 20 minutes. The rejection to raffinose is 85%, while the membranes are insoluble and swell less than 10% in N,N-dimethylformamide, NMP DMSO, methylenechloride, toluene and acetone, even after immersion for more than one week, and showed the same performance as when tested initially.

An underlying membrane prepared as described in Example 5 was coated with a 1% solution of the bromomethylated polymer of Preparation A in methylene chloride. The coated membrane was immersed in an aqueous solution of diaminoethane for 12 hours to crosslink the coating. The product was drained, dried, and immersed in a 1% chlorosulfonic acid solution in methylene chloride for 2 minutes, washed in aqueous ethanol, and then dried. The sulfonated membrane had a rejection of 84% to raffinose, with 29% rejection to sodium chloride. When the membrane was placed in 5% triethylamine in 1:1 aqueous ethanol for 12 hours washed and drained, it gave 70% rejection to raffinose and 18% rejection to sodium chloride. This final membrane contains both anionic and cationic groups.

EXAMPLE 7A

An underlying membrane prepared as described in Example 5 was coated with a 1% solution of the bromomethylated polymer of Preparation (A) in methylene chloride.

The coated membrane was immersed in an aqueous solution of diaminoethane for 12 hours to cross-link the coating. The obtained membrane was then drained, dried and immersed in a 1% chlorosulfonic acid solution in methylene chloride for 2 minutes, washed in ethanol and then dried.

The sulfonated membrane had a rejection of 84% to raffinose with 29% rejection to sodium chloride Then the membrane was placed in aqueous/ethanol 1:1 (v/v) solution containing 5% of ethylamine for 12 hours, washed and drained.

This membrane had a rejection of 70% to raffinose and 18% to sodium chloride. This final membrane contains both anionic and cationic groups.

EXAMPLE 7B

Example 7A was repeated using the crosslinked support of Example 6B, but the methylene chloride solution of bromomethylated polymer contained 0.5% $SnCl_4$. After effecting coating on the crosslinked support, the membrane was heated at 110° C. for 10 minutes, cooled and the series of steps effected as stated in Example 7A, without diaminoethane, but including chlorosulfonic acid treatment, and quaternization, giving a crosslinked amphoteric coating with 90% rejection to Congo Red.

EXAMPLE 8

Example 7A was repeated using tetrahydrofuran instead of methylene chloride, to give similar results.

EXAMPLE 9

Example 7A was repeated, but with 0.5% bromomethylated polyphenylene oxide. After the diaminoethane step, the membrane had a flux of 650 l./m$^2$ day and 75% rejection to raffinose. The crosslinked polyacrylonitrile membrane prior to coating had a flux of 3312 l./m$^2$ day and 80% rejection to Congo Red.

EXAMPLE 10

Example 7A was repeated using sodium butoxide instead of sodium ethoxide, with similar flux and rejection results.

EXAMPLE 11

Example 10 was repeated using sodium methoxide instead of butoxide. The extent of crosslinking was less than when either ethoxide or butoxide were used. The crosslinked coated membranes had similar flux rejection properties.

EXAMPLE 12

A polyacrylonitrile membrane as described in Example 5 was cast into a tubelet of microporous alumina ceramic; the membrane on the ceramic had a cutoff 70% to 70K Dextran. After insolubilizing as described, the membrane had a water flux and rejection to raffinose, of 1400 l./m$^2$/day and 68%, respectively. A similar membrane was further heated in air to 260° C. and kept at this temperature for 2 hours, to further crosslink the polyacrylonitrile. The resultant non-coated membrane had a rejection to sucrose of 57% and was dark black (as compared to dark brown of the membrane heated to 130° C.); it was carbonized by heating slowly to 700° C. and then had a rejection of 40% to sucrose. All three different types of membranes were coated by the procedure of Example 4 and 7B, and gave rejections to raffinose in the range of 85–95%.

EXAMPLE 13

Example 12 was repeated using a porous carbon tube coated with zirconia, the product having a molecular weight cutoff of 100,000. After coating and crosslinking, the resulting membranes had sucrose rejections above 50% and sodium chloride rejections of less than 20%.

EXAMPLE 14

Example 7A was repeated using polyvinylidene fluoride MW 33,000, instead of polyether-sulfone. The cast membrane before any treatment was soluble in DMF and had a MW cutoff of 100,000. After the sodium ethoxide step, followed by heating, the off-white membrane had become dark brown and had a flux of 10724 l./m$^2$ day and 40% rejection to Congo Red. After coating with 0.5% bromomethylated polyphenylene oxide and immersion in diaminoethane overnight, followed by immersion in 30% triethylamine, to crosslink and charge the coating (by quaternization), the membrane had a flux of 2880 l./m$^2$ day and 80% rejection to Congo Red. With a 1% coating of bromomethylated polyphenylene oxide and immersion in diaminoethane and triethylamine as above, the membrane had a 90% rejection to Congo Red. The base membrane after crosslinking with sodium ethoxide had a rejection to dextran 70K of 12%; it was used to clarify an extract of orange peel and gave a clear permeate (removal of the clouding agent) while retaining most of the brix content.

EXAMPLE 15

Sulfonated polyvinylidene fluoride was used to form the membrane. Sulfonation was carried out as in Example 1 of U.S. Pat. No. 4,188,354. The resulting membrane contained 1.3 meq./g. of sulfonic groups. A 21% solution of the polymer in 80:20 DMF/THF was cast on a nonwoven polyolefin TYVEK (R). The base membrane was crosslinked and coated as in Example 14 with 0.5% bromomethylated polyphenylene oxide, giving a membrane with 70% rejection to raffinose and a flux of 3648 l./m$^2$ day.

EXAMPLE 16

Example 12 is repeated on polyacrylonitrile hollow fibre, with 80 micron internal diameter and wall thickness of 20 microns, with a rejection to sucrose of 35%. After the processes described in Example 5, the result showed 60% rejection to sucrose and 90% to Congo Red. When the base membrane was further heated to 250° C. for 2 hours and then coated, the rejection to Congo Red was 87%. When the membranes were carbonized at 700° in nitrogen, the coated membrane gave 80% rejection to Congo Red.

EXAMPLE 17

The procedure for making a tubular microporous membrane from polyethersulfone described in Example 1 is repeated. The tubular membrane is immersed for 10 minutes in a solution (1% in ethanol) of sulfonated polysulfone containing 1.5 meq./g. sulfonic groups (Union Carbide 3500), removed, drained and heated to 70° C. for 30 minutes. The membrane had a rejection to Congo Red, before and after coating, of 75 and 98%, respectively; and to sucrose of 50 and 90%, respectively.

EXAMPLE 18

To insolubilize the coating of Example 17, the coated membrane is immersed for 15 minutes in a 1% solution of chlorosulfonic acid in trichlorotrifluoroethane (Freon TF, Dupont trichlorotrifluoroethane), removed, drained and heated at 110° C. for 15 minutes. Alternatively, the chlorosulfonation could be effected in presence of 0.5% stannic chloride. In either case, the coating was crosslinked and the membrane had a 98+% rejection to Congo Red.

EXAMPLE 19

Example 18 is repeated, except that chlorosulfonic acid is replaced by thionyl chloride. The product had a 97% rejection to Congo Red.

EXAMPLE 20

When the procedure of Example 17 is repeated, except that one starts with the crosslinked polyacrylonitrile product of Example 5, a membrane with a 94% rejection to Congo Red is obtained.

EXAMPLE 21

The crosslinked and insolubilized polyacrylonitrile membrane of Example 5 is coated with a 1% solution of sulfonated polyvinylidene fluoride (1.6 meq. sulfonic groups/g. polymer) in DMF, drained and heated at 110° C. for 5 seconds. The membrane was then immersed in a 50% aqueous ethylenediamine solution for 2 hours, drained, immersed in water and tested. The resulting membrane had a 90% rejection to Congo Red. When as the support membrane instead of polyacrylonitrile, there was used a sulfonated polyvinylidene fluoride membrane, the final membrane had a 96% rejection to Congo Red.

Membranes from different Examples were tested for stability in solvents, acids and bases. The results showed good solvent stability immersion tests for the crosslinked polyacrylonitrile, followed by the polyvinylidene fluoride membranes and last by the polysulfones, which were destroyed. However, the polyvinylidene fluoride membranes showed superior stability in concentrated caustic solutions. The solvents used for testing stability were DMF NMP, DMSO, toluene, methylene chloride, methyl-ethylketone, ethanol, acetone, hexane. The crosslinked poly-acrylonitrile membranes showed initial performance of flux and rejection, even after solvent immersion for more than one week.

While presently preferred modes of operating the invention have been particularly described, it will be appreciated by those skilled in the art that many modifications and variations are possible. The invention is therefore not to be construed as limited by the modes of operation particularly described, rather it will be defined only in accordance with the claims which follow.

We claim:

1. A composite membrane which comprises an underlying membrane selected from the group consisting of microfiltration, ultrafiltration and reverse osmosis membranes; and a coating thereon comprising at least one member selected from the group consisting of aromatic oxide polymers containing halomethyl groups, aromatic polysulfones containing halomethyl groups, aromatic polyether sulfones containing halomethyl groups, aromatic polyether ketones containing halomethyl groups, and halomethyl group containing arylalkene homopolymers and copolymers, aromatic oxide polymers containing halomethyl and quaternized tertiary aminomethyl groups, aromatic polysulfones containing halomethyl and quaternized tertiary aminomethyl groups, aromatic polyether sulfones containing halomethyl and quaternized tertiary aminomethyl groups, aromatic polyether ketones containing halomethyl and quaternized tertiary aminomethyl groups, halomethyl and quaternized tertiary aminomethyl groups containing arylalkene homopolymers and copolymers, sulfonated polyaromatic polymers and sulfonated poly(haloalkylenes), which has been provided with properties of minimal salt rejection by being subjected to a post-coating crosslinking treatment comprising at least one of (i) heating and (ii) treatment with at least one member selected from the group consisting of polyfunctional amines, polyfunctional thiols and chlorosulfonation agents.

2. The composite membrane according to claim 1, wherein said underlying membrane has a thickness within the range of from about 10 microns to about 1 mm., an average pore size in the range of from about 10 Å to about 5 microns, and a porosity of at least about 10%.

3. The composite membrane according to claim 2, wherein said underlying membrane has a thickness within the range of from about 50 microns to about 500 microns, an average pore size in the range of from about 20 Å to about 1000 Å and a porosity of greater than about 50%.

4. The composite membrane according to claim 1, wherein said underlying membrane comprises at least one member selected from the group consisting of aromatic polysulfones, aromatic polyether sulfones, aromatic polyether ketones, polyvinylidene fluoride, sulfonated polyvinylidene fluoride, acrylonitrile homopolymers and copolymers, substituted acrylonitrile homopolymers and copolymers, and any of such members which have been subjected to a crosslinking step.

5. The composite membrane according to claim 4, wherein said underlying membrane comprises at least one member selected from the group consisting of crosslinked acrylonitrile homopolymers and copolymers, and crosslinked substituted acrylonitrile homopolymers and copolymers.

6. The composite membrane according to claim 5, wherein said underlying membrane is one which has been initially formed from at least one member selected from the group consisting of non-crosslinked acrylonitrile homopolymers and copolymers, and non-crosslinked substituted acrylonitrile homopolymers and copolymers, and has been subjected to at least one in situ treatment step in order to promote crosslinking of said at least one member.

7. The composite membrane according to claim 6, wherein said at least one in situ treatment step comprises at least one of the following steps, provided that when said at least one step comprises a plurality of steps, then the latter are effected in the stated sequence commencing with any of steps (a), (b) or (c):

(a) treatment with a member selected from the group consisting of acids, bases, and free radical initiators;

(b) heating at a temperature which is below about 130° C.;

(c) heating at a temperature in the region of about 110° to about 130° C;

(d) heating at a temperature above about 130° C. and below about 250° C.;

(e) heating at a temperature in the region of about 250° C.;

(f) heating at a temperature above about 250° C. and below about 600° C.;

(g) heating at a temperature within the range of from about 600° C. to about 1000° C.;

and the thus-obtained underlying membrane is cooled to a temperature which is at most about 130° C.

8. The composite membrane according to claim 4, wherein in said substituted acrylonitrile, said substituent is selected from the group consisting of alkyl, aryl, halogen and thio.

9. The composite membrane according to claim 4, wherein said underlying membrane comprises at least one member selected from the group consisting of crosslinked polyvinylidene fluoride and crosslinked sulfonated polyvinylidene fluoride.

10. The composite membrane according to claim 9, wherein said underlying membrane is one which has been initially formed from at least one member selected from the group consisting of non-crosslinked polyvinylidene fluoride and non-crosslinked sulfonated polyvinylidene fluoride, and has been subjected to at least one in situ treatment step in order to promote crosslinking of said at least one member.

11. The composite membrane according to claim 10, wherein said at least one in situ treatment step comprises the steps of treatment with a base and subsequent heating at an elevated temperature.

12. The composite membrane according to claim 11, wherein said base is at least one alkali metal alkoxide.

13. The composite membrane according to claim 12, wherein said base is selected from the group consisting of the methoxide, ethoxide, propoxide and butoxide of sodium and potassium.

14. The composite membrane according to claim 11, wherein said base is a polyfunctional amine in which the amine group is selected from the group consisting of primary, secondary and tertiary amines.

15. The composite membrane according to claim 1, wherein said underlying membrane is supported on a porous substrate.

16. The composite membrane according to claim 15, wherein said porous substrate is fabricated from at least one member selected from the group consisting of non-woven and woven cellulosics, polyethylene, polypropylene, nylon, vinyl chloride homo-and co-polymers, polystyrene, polyesters, polyvinylidene fluoride, polytetrafluoroethylene, glass fibers, porous carbon, graphite, inorganic substrates based on alumina and/or silica, and such inorganic substrates coated with zirconium oxides.

17. The composite membrane according to claim 1, wherein said underlying membrane is formed as a hollow fiber or tubelet, or is planar.

18. The composite membrane according to claim 1, wherein said sulfonated poly(haloalkylenes) are selected from the group consisting of sulfonated polyvinyl chloride, polyvinyl fluoride, polyvinylidene fluoride and polyvinylidene fluoride/hexafluoropropylene.

19. The composite membrane according to claim 1, wherein following said post-coating crosslinking treatment, said composite membrane has been subjected to at least one reaction which introduces at least one function selected from the group consisting of amino, hydroxyl, quaternary ammonium, carboxylic and sulfonic groups.

20. The composite membrane according to claim 1, wherein said post-coating crosslinking treatment is effected in the presence of a Lewis acid.

21. The composite membrane according to claim 20, wherein the Lewis acid is stannic chloride.

22. The composite membrane according to claim 1, wherein the thickness of said crosslinked coating lies within the range of from about 1 to about 5000 nm.

23. A process for separating at least one inorganic salt from at least one organic compound in aqueous media, which comprises contacting said media under a superatmospheric pressure greater than the osmotic pressure with a composite membrane according to claim 1 and thereafter recovering the thus treated said at least one organic compound in aqueous media containing a relatively depleted proportion of said at least one inorganic salt.

24. The process according to claim 23, wherein said at least one organic compound comprises at least one organic compound of molecular weight below about 1500.

25. The process according to claim 24, wherein said at least one organic compound comprises at least one organic compound of molecular weight below about 1000.

26. A process for separating at least one inorganic salt from at least one organic compound in aqueous media, which comprises contacting said media under a superatmospheric pressure greater than the osmotic pressure with a composite membrane according to claim 1 and thereafter recovering the thus treated said at least one organic compound in aqueous media containing a relatively depleted proportion of said at least one inorganic salt, and wherein said at least one organic compound comprises at least one member selected from the group consisting of monosaccharides, disaccharides and polysaccharides.

27. A process for separating at least one member selected from the group consisting of insoluble particles, colloidal particles and solute molecules from an organic solvent, which comprises contacting said solvent containing at least one said member, under a superatmospheric pressure greater than the osmotic pressure, with a composite membrane according to claim 1 and thereafter recovering the thus treated solvent.

28. The process according to claim 27, wherein said organic solvent comprises at least one member selected from the group consisting of alcohols, ethers, dimethylformamide, N-methylpyrrolidone and dimethyl sulfoxide.

29. A membrane which is useful as the underlying membrane in the composite membrane according to claim 1, and which comprises at least one member selected from the group consisting of microfiltration, ultrafiltration and reverse osmosis membranes, said at least one member being constructed from at least one polymer selected from the group consisting of crosslinked acrylonitrile homopolymers and copolymers, and crosslinked substituted acrylonitrile homopolymers and copolymers.

30. The membrane according to claim 29, which has been initially formed from at least one member selected from the group consisting of non-crosslinked acrylonitrile homopolymers and copolymers, and non-crosslinked substituted acrylonitrile homopolymers and copolymers, and has been subjected to at least one in situ treatment step in order to promote crosslinking of said at least one member.

31. The membrane according to claim 30, wherein said at least one in situ treatment step comprises at least one of the following steps, provided that when said at least one step comprises a plurality of steps, then the latter are effected in the stated sequence commencing with any of steps (a), (b) or (c):
   (a) treatment with at least one alkali metal hydroxide;
   (b) treatment with a member selected from the group consisting of free radical initiators, acids, and bases other than alkali metal hydroxides;
   (c) heating at a temperature below about 130° C.;
   (d) heating at a temperature in the region of about 110° to about 130° C.;
   (e) heating at a temperature above about 130° C. and below about 250° C.;
   (f) heating at a temperature in the region of about 250° C.;
   (g) heating at a temperature above about 250° C. and below about 600° C.;
   (h) heating at a temperature within the range of from about 600° C. to about 1000° C.;
and the thus-obtained membrane is cooled to a temperature at most about 130° C.

32. The membrane according to claim 29, wherein in said substituted acrylonitrile, said substituent is selected from the group consisting of alkyl, aryl, halogen and thio.

33. The membrane according to claim 29, which has a thickness within the range of from about 10 microns to about 1 mm., an average pore size in the range of from about 10 Å to about 5 microns, and a porosity of at least about 10%.

34. The membrane according to claim 33, which has a thickness within the range of from about 100 microns to about 500 microns, an average pore size in the range of from about 20 Å to about 1000 Å and a porosity of greater than about 50%.

35. The membrane according to claim 29, which is supported on a porous substrate.

36. The membrane according to claim 35, wherein said porous substrate is fabricated from at least one member selected from the group consisting of non-woven and woven cellulosics, polyethylene, polypropylene, nylon, vinyl chloride homo-and co-polymers, polystyrene, polyesters, polyvinylidene fluoride, polytetrafluoroethylene, glass fibers, porous carbon, graphite, inorganic substrates based on alumina and/or silica, and such inorganic substrates coated with zirconium oxides.

37. A membrane according to claim 29, which is formed as a hollow fiber or tubelet, or is planar.

38. A membrane which is useful as the underlying membrane in the composite membrane according to claim 1, and which comprises at least one member selected from the group consisting of microfiltration, ultrafiltration and reverse osmosis membranes, said at least one member being constructed from at least one polymer selected from the group consisting of crosslinked polyvinylidene fluoride and crosslinked sulfonated polyvinylidene fluoride.

39. The membrane according to claim 38, wherein said membrane is one which has been initially formed from at least one member selected from the group consisting of non-crosslinked polyvinylidene fluoride and non-crosslinked sulfonated polyvinylidene fluoride, and has been subjected to at least one in situ treatment step in order to promote crosslinking of said at least one member.

40. The membrane according to claim 39, wherein said at least one in situ treatment step comprises treatment with at least one member selected from the group consisting of polyfunctional amines and polyfunctional thiols.

41. A process comprising: separating at least one member selected from the group consisting of insoluble particles, colloidal particles and solute molecules from an organic solvent, which further comprises contacting said solvent containing at least one said member under a superatmospheric pressure greater than the osmotic pressure with:
   a membrane having properties of minimal salt rejection which comprises at least one member selected from the group consisting of crosslinked acrylonitrile homopolymers and copolymers, and crosslinked substituted acrylonitrile homopolymers and copolymers;
and thereafter recovering the thus treated solvent.

42. A process according to claim 41, wherein said organic solvent comprises at least one member selected from the group consisting of alcohols, ethers, dimethylformamide, N-methylpyrrolidone and dimethyl sulfoxide.

43. A process comprising: separating by retention at a membrane having properties of minimal salt rejection of at least one member of high molecular weight selected from the group consisting of insoluble particles, colloidal particles and soluble polymers from aqueous media, while permitting the passage therethrough of any dissolved salts and organic compounds having a molecular weight less than 5000, which further comprises contacting said media containing at least one said member under a superatmospheric pressure greater than the osmotic pressure with:
   a membrane which comprises at least one member selected from the group consisting of crosslinked acrylonitrile homopolymers and copolymers, and crosslinked substituted acrylonitrile homopolymers and copolymers;
and thereafter recovering the thus treated media.

44. A process according to claim 43, wherein said media are selected from the group consisting of juices and other extracts of fruit and vegetable origin.

* * * * *